(12) United States Patent
Chowdhury et al.

(10) Patent No.: US 8,905,566 B2
(45) Date of Patent: Dec. 9, 2014

(54) THERMAL MITIGATION OF FLAT-PANEL DISPLAYS

(75) Inventors: Ihtesham H. Chowdhury, Sunnyvale, CA (US); Frank F. Liang, San Jose, CA (US); Amaury J. Heresztyn, San Jose, CA (US); Jeremy C. Franklin, San Francisco, CA (US); Benjamin M. Rappoport, Los Gatos, CA (US); Derek W. Wright, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 349 days.

(21) Appl. No.: 13/534,170

(22) Filed: Jun. 27, 2012

(65) Prior Publication Data

US 2014/0003083 A1 Jan. 2, 2014

(51) Int. Cl.
*F21V 29/00* (2006.01)

(52) U.S. Cl.
USPC ............ 362/97.2; 362/373; 362/610; 349/62; 349/65

(58) Field of Classification Search
CPC ....... F21V 29/02; F21V 29/002; G09F 13/18; G02F 1/133308; G02F 1/133524
USPC ........ 362/97.2, 373, 610, 561; 349/62, 65, 58
See application file for complete search history.

(56) References Cited

U.S. PATENT DOCUMENTS

| 7,226,184 B2 * | 6/2007 | Takahashi ..................... 362/218 |
| 7,261,434 B2 * | 8/2007 | Miyamoto ..................... 362/218 |
| 2011/0167690 A1 * | 7/2011 | Bjarnason et al. ............. 40/582 |

* cited by examiner

*Primary Examiner* — Karabi Guharay
(74) *Attorney, Agent, or Firm* — Park, Vaughan, Fleming & Dowler LLP; Steven E. Stupp

(57) ABSTRACT

A flat-panel display (such as a liquid crystal display) includes one or more features that reduce temperature changes in an array of light valves disposed on a substrate. In particular, heat generated in a light source and/or electronics is conducted away from the light values. For example, a light-source holder, which contains the light source, may include holes that increase the thermal resistance between the light source and the substrate. Alternatively, the light-source holder may include a material having a thermal conductivity that is higher than that of stainless steel. In addition, the flat-panel display may include materials and/or a geometry that increases the thermal resistance along a direction in a plane of the substrate. By reducing temperature changes in the flat-panel display, these features can reduce or eliminate color changes and other visual artifacts that can degrade the quality of displayed images.

20 Claims, 4 Drawing Sheets

THERMAL MITIGATION OF FLAT-PANEL DISPLAYS

BACKGROUND

1. Field

The described embodiments relate to techniques for controlling the temperature of flat-panel displays. More specifically, the described embodiments relate to techniques for reducing the absolute temperature and temperature gradients in flat-panel displays in portable electronic devices.

2. Related Art

Flat-panel displays are typically lighter, thinner and consume less power than traditional displays, such as cathode ray tubes. As a consequence, flat-panel displays are widely used in portable electronic devices.

Many flat-panel displays are active-matrix addressed displays in which two-dimensional arrays of light valves are used to modulate light from a light source. For example, in liquid crystal displays, a liquid crystal is sandwiched between two electrodes. By applying an electrical voltage between the electrodes, the light diffusing or polarizing properties of the liquid crystal can be modified so that light is transmitted or blocked. The spatial modulation of the light across a two-dimensional array creates an image.

However, the light sources (such as light-emitting diodes) and electronics used to illuminate and apply electrical signals to liquid crystal displays generate heat. This heat can cause temperature changes in a liquid crystal display. Because the optical properties of liquid crystals are often a function of temperature, these temperature changes can cause color changes and other visual artifacts that can degrade the quality of the displayed image.

SUMMARY

The described embodiments include a display that includes a substrate with a front surface and a back surface having a two-dimensional array of light valves disposed on the front surface. The display also includes a light-source holder with an outer surface and an inner surface, where the outer surface is thermally coupled to the back surface of the substrate. Moreover, a light source (such as a light-emitting diode) is contained within a cavity defined by the inner surface of the light-source holder. In order to increase the thermal resistance between the light source and the substrate (and, thus, to control heating of the substrate by the light source), the light-source holder includes holes defined by edges between the outer surface and the inner surface.

For example, the holes in the light-source holder may be disposed in a region of the outer surface of the light-source holder which is thermally coupled to the back surface of the substrate. Additionally, the light-source holder may include a material having a thermal conductivity greater than that of stainless steel.

In some embodiments, the display includes a circuit board with a top surface and a bottom surface, where the top surface is thermally coupled to the outer surface of the light-source holder. Moreover, the display may include a radio-frequency shield enclosing integrated circuits disposed on the bottom surface of the circuit board. Furthermore, an integrated circuit may be disposed on the front surface of the substrate, and thermal tape may thermally couple the integrated circuit to the radio-frequency shield.

The display may include a material between the outer surface of the light-source holder and the top surface of the circuit board that may decrease the thermal resistance between the light-source holder and the circuit board. Alternatively or additionally, the display may include a plate adjacent to the circuit board and thermally coupled to the outer surface of the light-source holder, and a material between the outer surface of the light-source holder and the plate may decrease the thermal resistance between the light-source holder and the plate. For example, the material may be at least in part surrounded by another material.

In some embodiments, the display includes a light pipe optically coupled to the light source and the back surface of the substrate, where the light pipe has a higher thermal conductivity along a symmetry axis of the light pipe than perpendicular to the symmetry axis. Alternatively or additionally, the display may include an optical reflector optically coupled to the light pipe on an opposite side of the light pipe than the substrate. The optical reflector may include an optical component and a structural component, where the structural component has a higher thermal conductivity than the optical component.

The light-source holder may have a height between the back surface of the substrate and the top surface of the circuit board which is less than 2 mm. Furthermore, the light-source holder may have a thickness between the inner surface and the outer surface which is less than 0.2 mm.

Another embodiment provides a display that includes: the substrate, the light source, and the light pipe. The light pipe may have a higher thermal conductivity along a symmetry axis of the light pipe than perpendicular to the symmetry axis. For example, the light pipe may include polymers that are at least partially aligned along the symmetry axis and/or metal particles. Alternatively or additionally, the display may include the optical reflector with the optical component and the structural component. The structural component may include a material other than plastic.

Another embodiment provides a portable device that includes one of the embodiments of the display.

Another embodiment provides a method for controlling the temperature of a display. During operation, the light source, contained within the cavity defined by the inner surface of the light-source holder, provides light to the two-dimensional array of light valves disposed on a surface of the substrate. Moreover, the thermal resistance between the light source and the substrate is increased by holes defined by edges between the outer surface of the light-source holder and the inner surface, where the outer surface is thermally coupled to the back surface of the substrate.

BRIEF DESCRIPTION OF THE FIGURES

Note that like reference numerals refer to corresponding parts throughout the drawings. Moreover, multiple instances of the same part are designated by a common prefix separated from an instance number by a dash.

DETAILED DESCRIPTION

Figure 1:
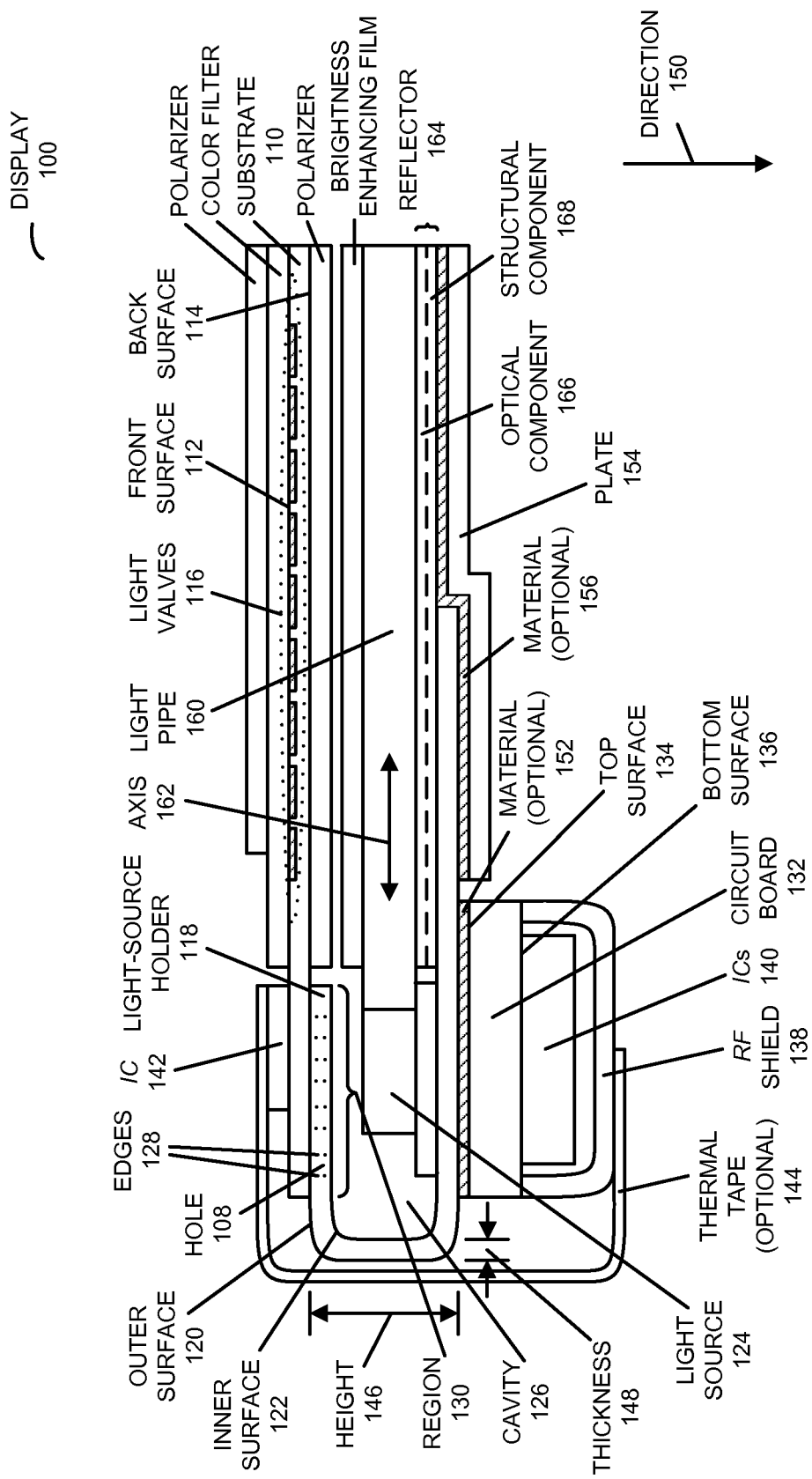
FIG. 1 is a block diagram illustrating a cross-sectional view of a display in accordance with an embodiment of the present disclosure.

FIG. 1 presents a block diagram illustrating a display 100. This display includes a substrate 110 with a front surface 112 and a back surface 114 having a two-dimensional array of light valves 116 disposed on front surface 112. For example, display 100 may include a liquid crystal display, and light valves 116 may be driven using thin-film transistors. Display 100 also includes a light-source holder 118 with an outer surface 120 and an inner surface 122, where outer surface 120 is thermally coupled to back surface 114. Moreover, a light source 124 (such as a light-emitting diode or a light-emitting-diode array) is contained within a cavity 126 defined by inner surface 122 of the light-source holder 118.

During operation of display 100, heat generated by light source 124 is conducted to substrate 110. As noted previously, this heat can result in a change in the temperature and/or temperature gradients in light valves 116, and thus in color and visual artifacts in images displayed on display 100. Because heat conduction is governed by Fourier's law of heat conduction, in a one-dimensional analog of display 100 the thermal resistance (R) between light source 124 and substrate 110 can be expressed as $$R = \frac{L}{\kappa \cdot A}, \quad (1)$$

where L is a length of a thermal path (in this case, a distance along light-source holder 118), K is the thermal conductivity of light-source holder 118, and A is a cross-sectional area of light-source holder 118. Note that in applications such as portable electronic device 400, which is described below with reference to FIG. 4, space and weight constraints may restrict the material(s) and the geometry of light-source holder 118.

Figure 2:
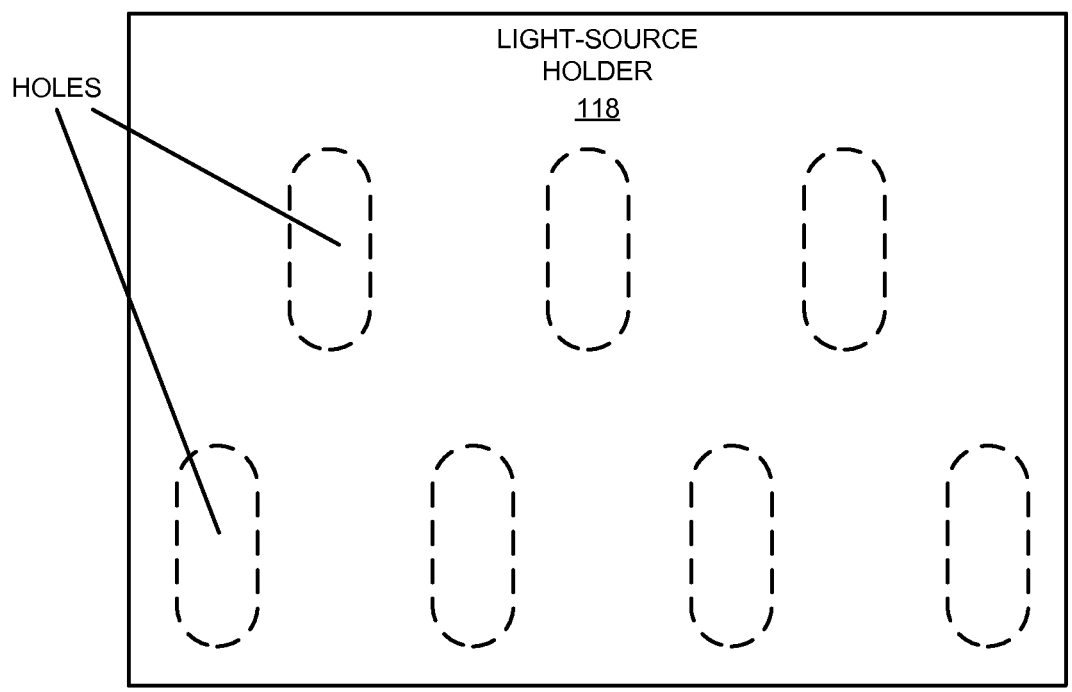
FIG. 2 is a block diagram illustrating a top-view of a light-source holder in the display of FIG. 1 in accordance with an embodiment of the present disclosure.

Based on Eqn. 1, R between light source 124 and substrate 110 can be increased (and, thus, heating of substrate 110 by light source 124 can be reduced) by decreasing the effective cross-sectional area and/or K. For example, light-source holder 118 may include holes defined by edges (such as hole 108 defined by edges 128) between outer surface 120 and inner surface 122 (such as 10×1 mm² oblong holes staggered approximately every 5 mm, which are illustrated in FIG. 2). These holes may be disposed in a region 130 which is thermally coupled to back surface 114, and may increase R without reducing a mechanical strength of light-source holder 118.

Additionally, light-source holder 118 may include a material having K greater than that of stainless steel. For example, light-source holder 118 may include a copper alloy such as C18080 (from Olin Brass of Louisville, Ky.) that has a K twenty-times higher than that of stainless steel.

Display 100 may include: a circuit board 132 with a top surface 134 and a bottom surface 136, where top surface 134 is thermally coupled to outer surface 120; a radio-frequency (RF) shield 138 enclosing integrated circuits (ICs) 140 disposed on bottom surface 136; and an integrated circuit (IC) 142 (such as a display driver) disposed on front surface 112. During operation of display 100, heat may also be generated by IC 142. Therefore, IC 142 may be thermally coupled to RF shield 138 to reduce the heating of substrate 110 (and, thus, light valves 116). For example, optional thermal tape 144 (such as copper tape) may thermally couple IC 142 to RF shield 138.

In addition to the thermal properties, light-source holder 118 may be designed to have particular mechanical properties or a geometry needed for use in applications such as portable electronic devices. For example, light-source holder 118 may have a height 146 between back surface 114 and top surface 134 which is less than 2 mm (such as 1.37 mm). Furthermore, light-source holder 118 may have a thickness 148 between outer surface 120 and inner surface 122 which is less than 0.2 mm (such as 0.15 mm).

Figure 3:
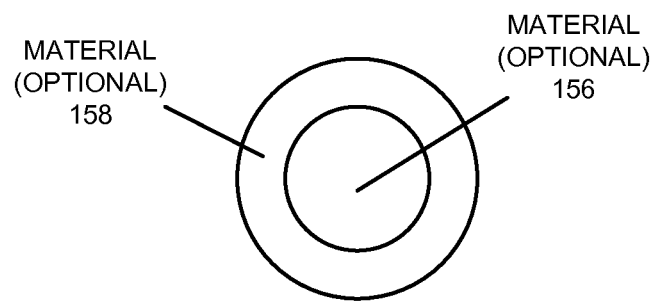
FIG. 3 is a block diagram illustrating a cross-sectional view of a thermal-coupling material in the display of FIG. 1 in accordance with an embodiment of the present disclosure.

Alternatively or additionally to the aforementioned features in light-source holder 118, heat conduction along a direction 150 perpendicular to a plane of substrate 110 in display 100 may be increased to allow heat generated by light source 124 and/or electronics (such as IC 142) to conduct away from substrate 110 (and, thus, light valves 116). For example, an optional material 152 (such as a thermally conducting grease, a thermal adhesive, a metallic tape, etc.) may be positioned between outer surface 120 and top surface 134, which may decrease R between light-source holder 118 and circuit board 132. Furthermore, display 100 may include a metal plate 154 adjacent to circuit board 132. This plate may be thermally coupled to outer surface 120 by an optional material 156 between outer surface 120 and plate 154, thereby decreasing R between light-source holder 118 and plate 154. For example, optional material 156 may include: solder, a pressure-sensitive adhesive or a thermal grease (such as silicone grease). However, it can be difficult to control the gap or spacing between outer surface 120 and plate 154 using a pressure-sensitive adhesive. Note that, because thermal greases can be hard to handle or contain during assembly or rework of display 100 (i.e., they can be messy), optional material 156 may, at least in part, be surrounded by another optional material 158 (as shown in FIG. 3). For example, optional material 156 may be rolled in a thermal fabric or contained in a tube.

Display 100 may include a light pipe 160 optically coupled to light source 124 and back surface 114. In particular, light pipe 160 may convey light generated by light source 124 and may illuminate light valves 116. To facilitate heat conduction along direction 150, light pipe 160 may have a higher K along a symmetry axis 162 of light pipe 160 than perpendicular to symmetry axis 162. For example, light pipe 160 may include polymers that are at least partially aligned along symmetry axis 162 (such as D or E-series polymers from Cool Polymers, Inc. of North Kingstown, R.I.) and/or a thermally enhanced polycarbonate that includes metal particles. These features in light pipe 160 may increase its heat spread capability so that heat is conducted away from substrate 110 and uniformly conducted across light values 116 (i.e., heat is uniformly transported across light values 116).

Furthermore, display 100 may include a reflector 164 optically coupled to light pipe 160 on an opposite side of light pipe 160 than substrate 110. An optical component 166 (such as a so-called 'white' reflector or a specular reflector from 3M, Inc. of Minneapolis, Minn.) in reflector 164 may reflect light along direction 150. In addition, a structural component 168 in reflector 164 may provide mechanical support for optical component 166. To facilitate heat diffusion along direction 150, structural component 168 may have a higher K than optical component 166. For example, structural component 168 may include a material other than plastic, such as copper foil or a graphite film instead of polyethylene terephthalate. These features in reflector 164 may increase its heat spread capability so that heat is conducted away from substrate 110 and uniformly conducted across light values 116 (i.e., heat is uniformly transported across light values 116).

Figure 4:
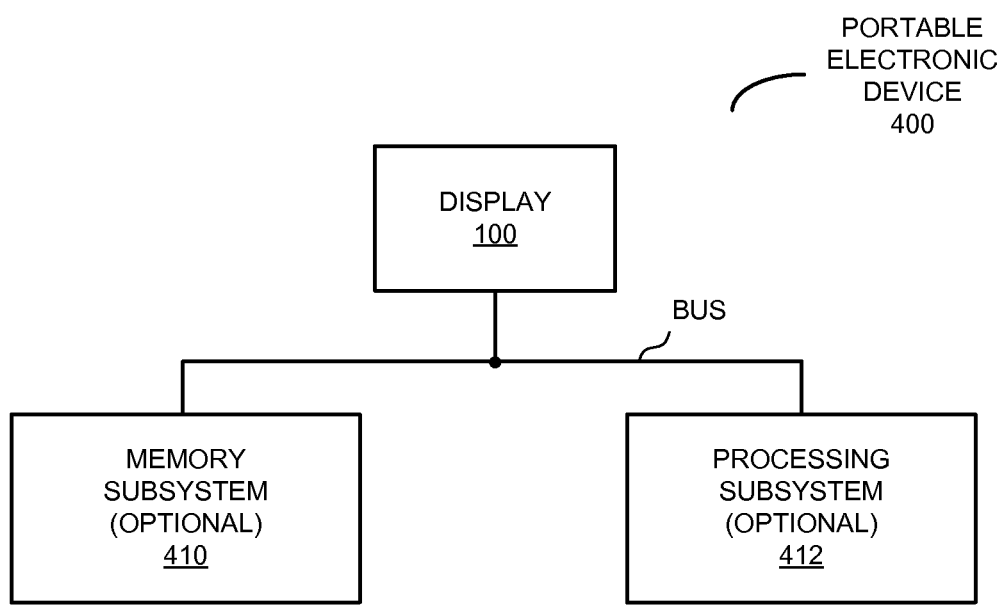
FIG. 4 is a block diagram illustrating a portable electronic device that includes the display of FIG. 1 in accordance with an embodiment of the present disclosure.

As noted previously, display 100 may be used in a portable electronic device. This is shown in FIG. 4, which presents a block diagram illustrating a portable electronic device 400. Portable electronic device 400 may include: one or more program modules or sets of instructions stored in an optional memory subsystem 410 (such as DRAM or another type of volatile or non-volatile computer-readable memory), which may be executed by an optional processing subsystem 412. Note that the one or more computer programs may constitute a computer-program mechanism. Moreover, instructions in the various modules in optional memory subsystem 410 may be implemented in: a high-level procedural language, an object-oriented programming language, and/or in an assembly or machine language. Furthermore, the programming language may be compiled or interpreted, e.g., configurable or configured, to be executed by optional processing subsystem 412.

In some embodiments, functionality in these circuits, components and devices may be implemented in one or more: application-specific integrated circuits (ASICs), field-programmable gate arrays (FPGAs), and/or one or more digital signal processors (DSPs). Moreover, the circuits and components may be implemented using any combination of analog and/or digital circuitry, including: bipolar, PMOS and/or NMOS gates or transistors. Furthermore, signals in these embodiments may include digital signals that have approximately discrete values and/or analog signals that have continuous values. Additionally, components and circuits may be single-ended or differential, and power supplies may be unipolar or bipolar. Note that components in display 100 (FIG. 1) and portable electronic device 400 may be directly or indirectly thermally coupled.

Portable electronic device 400 may include one of a variety of devices that can include a display, including: a desktop computer, a server, a laptop computer, a media player (such as an MP3 player), an appliance, a subnotebook/netbook, a tablet computer, a smartphone, a cellular telephone, a network appliance, a set-top box, a personal digital assistant (PDA), a toy, a controller, a digital signal processor, a game console, a device controller, a computational engine within an appliance, a consumer-electronic device, a portable computing device, a personal organizer, and/or another electronic device.

More generally, the thermal management techniques illustrated in display 100 (FIG. 1) may be used in an electronic device in which the display is optimized for thickness based on size and/or weight constraints.

Although we use specific components to describe display 100 (FIG. 1) and portable electronic device 400, in alternative embodiments different components and/or subsystems may be used. For example, the preceding embodiments illustrated the use of passive thermal techniques to mitigate temperature-related visual artifacts in displayed images. However, in other embodiments display 100 (FIG. 1) may use active techniques to manage the temperature, including a feedback technique based on one or more thermal sensors (such as temperature sensors or sensors that determine the polarization associated with a liquid crystal). Moreover, ICs 140 (FIG. 1) may have increased copper thickness and thermal vias to conduct heat away from substrate 110 (FIG. 1). Furthermore, while a liquid crystal display was used as an illustration, in other embodiments the aforementioned thermal-management techniques may be applied in a wide variety of flat-panel displays, including: an electroluminescent display, a field emission (or nano-emissive) display, an interferometric modulator display, a light-emitting-diode display, an organic light-emitting-diode display, a plasma display, a quantum dot display, or a surface-conduction electron-emitter display.

Additionally, one or more of the components may not be present in FIGS. 1-3. In some embodiments, display 100 (FIG. 1) and/or portable electronic device 400 include one or more additional components that are not shown in FIGS. 1-3. Also, although separate components are shown in FIGS. 1-3, in some embodiments some or all of a given component can be integrated into one or more of the other components and/or positions of components can be changed.

In the preceding description, we refer to 'some embodiments.' Note that 'some embodiments' describes a subset of all of the possible embodiments, but does not always specify the same subset of embodiments.

Figure 5:
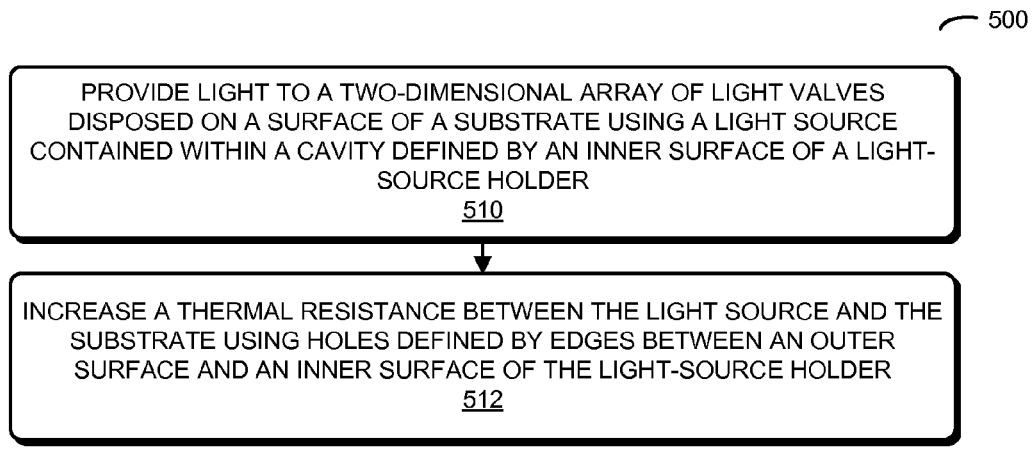
FIG. 5 is a flowchart illustrating a method for controlling the temperature of a display in accordance with an embodiment of the present disclosure.

We now describe embodiments of a method. FIG. 5 presents a flowchart illustrating a method 500 for controlling the temperature of a display, such as display 100 (FIG. 1). During operation, the light source, contained within the cavity defined by the inner surface of the light-source holder, provides light to the two-dimensional array of light valves disposed on the front surface of the substrate (operation 510). Moreover, the thermal resistance between the light source and the substrate is increased by holes defined by edges between the outer surface and the inner surface of the light-source holder (operation 512), where the outer surface is thermally coupled to the back surface of the substrate.

In some embodiments of method 500, there may be additional or fewer operations. Moreover, the order of the operations may be changed, and/or two or more operations may be combined into a single operation.

The foregoing description is intended to enable any person skilled in the art to make and use the disclosure, and is provided in the context of a particular application and its requirements. Moreover, the foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art, and the general principles defined herein may be applied to other embodiments and applications without departing from the spirit and scope of the present disclosure. Additionally, the discussion of the preceding embodiments is not intended to limit the present disclosure. Thus, the present disclosure is not intended to be limited to the embodiments shown, but is to be accorded the widest scope consistent with the principles and features disclosed herein.

What is claimed is:

1. A display, comprising:
    a substrate with a front surface and a back surface having a two-dimensional array of light valves disposed on the front surface;
    a light-source holder with an outer surface and an inner surface, wherein the outer surface is thermally coupled to the back surface of the substrate; and
    a light source contained within a cavity defined by the inner surface of the light-source holder, wherein the light-source holder includes holes defined by edges between the outer surface and the inner surface to increase a thermal resistance between the light source and the substrate.

2. The display of claim 1, wherein the holes in the light-source holder are disposed in a region of the outer surface of the light-source holder which is thermally coupled to the back surface of the substrate.

3. The display of claim 1, wherein the light-source holder includes a material having a thermal conductivity greater than that of stainless steel.

4. The display of claim 1, wherein the display further comprises:
- a circuit board with a top surface and a bottom surface, wherein the top surface is thermally coupled to the outer surface of the light-source holder;
- a radio-frequency shield enclosing integrated circuits disposed on the bottom surface of the circuit board;
- an integrated circuit disposed on the front surface of the substrate; and
- thermal tape thermally coupling the integrated circuit to the radio-frequency shield.

5. The display of claim 1, wherein the display further includes:
- a circuit board with a top surface and a bottom surface, wherein the top surface is thermally coupled to the outer surface of the light-source holder; and
- a material between the outer surface of the light-source holder and the top surface of the circuit board which decreases a thermal resistance between the light-source holder and the circuit board.

6. The display of claim 1, wherein the display further includes:
- a circuit board with a top surface and a bottom surface, wherein the top surface is thermally coupled to the outer surface of the light-source holder;
- a plate adjacent to the circuit board and thermally coupled to the outer surface of the light-source holder; and
- a material between the outer surface of the light-source holder and the plate to decrease a thermal resistance between the light-source holder and the plate.

7. The display of claim 6, wherein the material is at least in part surrounded by another material.

8. The display of claim 1, wherein the display further includes a light pipe optically coupled to the light source and the back surface of the substrate; and
- wherein the light pipe has a higher thermal conductivity along a symmetry axis of the light pipe than perpendicular to the symmetry axis.

9. The display of claim 1, wherein the display further includes:
- a light pipe optically coupled to the light source and the back surface of the substrate; and
- an optical reflector optically coupled to the light pipe on an opposite side of the light pipe than the substrate, wherein the optical reflector includes an optical component and a structural component,
- wherein the structural component has a higher thermal conductivity than the optical component.

10. A portable electronic device, comprising:
a display, wherein the display includes:
- a substrate with a front surface and a back surface having a two-dimensional array of light valves disposed on the front surface;
- a light-source holder having an outer surface and an inner surface, wherein the outer surface is thermally coupled to the back surface of the substrate; and
- a light source contained within a cavity defined by the inner surface of the light-source holder, wherein the light-source holder includes holes defined by edges between the outer surface and the inner surface to increase a thermal resistance between the light source and the substrate.

11. The electronic device of claim 10, wherein the holes in the light-source holder are disposed in a region of the outer surface of the light-source holder which is thermally coupled to the back surface of the substrate.

12. The electronic device of claim 11, wherein the light-source holder includes a material having a thermal conductivity greater than that of stainless steel.

13. The electronic device of claim 11, wherein the display includes a circuit board with a top surface and a bottom surface;
- wherein the top surface is thermally coupled to the outer surface of the light-source holder; and
- wherein the light-source holder has a height between the back surface of the substrate and the top surface of the circuit board which is less than 2 mm.

14. The electronic device of claim 11, wherein the light-source holder has a thickness between the inner surface and the outer surface which is less than 0.2 mm.

15. A display, comprising:
- a substrate having a front surface and a back surface with a two-dimensional array of light valves disposed on the front surface;
- a light source; and
- a light pipe optically coupled to the light source and the back surface of the substrate,
- wherein the light pipe has a higher thermal conductivity along a symmetry axis of the light pipe than perpendicular to the symmetry axis.

16. The display of claim 15, wherein the light pipe includes polymers that are at least partially aligned along the symmetry axis.

17. The display of claim 15, wherein the light pipe includes metal particles.

18. The display of claim 15, wherein the display further includes an optical reflector optically coupled to the light pipe on an opposite side of the light pipe than the substrate;
- wherein the optical reflector includes an optical component and a structural component; and
- wherein the structural component has a higher thermal conductivity than the optical component.

19. The display of claim 18, wherein the structural component includes a material other than plastic.

20. A portable electronic device, comprising:
a display, wherein the display includes:
- a substrate having a front surface and a back surface with a two-dimensional array of light valves disposed on the front surface;
- a light source; and
- a light pipe optically coupled to the light source and the back surface of the substrate,
- wherein the light pipe has a higher thermal conductivity along a symmetry axis of the light pipe than perpendicular to the symmetry axis.

* * * * *